United States Patent [19]

Hervé

[11] Patent Number: 4,576,193

[45] Date of Patent: Mar. 18, 1986

[54] DEVICE FOR WORKING ON A SUBMERGED VALVE

[75] Inventor: Jean-Luc A. Hervé, Noisy-Le-Roi, France

[73] Assignee: Compagnie Francaise des Petroles, Paris, France

[21] Appl. No.: 711,128

[22] Filed: Mar. 13, 1985

[30] Foreign Application Priority Data

Mar. 22, 1984 [FR] France .................. 84 04428

[51] Int. Cl.<sup>4</sup> ............................................. F16K 43/00
[52] U.S. Cl. ..................... 137/15; 137/315; 137/236.1
[58] Field of Search ............... 137/15, 236 R, 236 S, 137/315; 138/97, 99; 166/339, 340; 285/15

[56] References Cited

U.S. PATENT DOCUMENTS

| | | | |
|---|---|---|---|
| 3,626,576 | 3/1969 | Ray | 137/15 |
| 3,827,448 | 8/1974 | Alba | 137/15 |
| 4,497,332 | 2/1985 | Sewell et al. | 137/315 |

Primary Examiner—Samuel Scott
Assistant Examiner—Noah Kamen
Attorney, Agent, or Firm—Sughrue, Mion, Zinn, Macpeak and Seas

[57] ABSTRACT

Apparatus for servicing a submerged valve 4 comprises a lower vertical box 13 fixed to the valve body 3, surrounding the valve actuating rod 9 and open at its upper end, and an upper box 19 open at its lower end which contains a lifting winch 28, a screwing and unscrewing robot 32, a camera 30, 31, and pumps 27. An intermediate valve 17 is slidable in a flat body 16, and may be sealingly connected between the upper and lower boxes. In use the flat body of the intermediate valve and the upper box are lowered onto and connected to the lower box. The intermediate valve is then opened and both boxes are emptied of water and filled with nitrogen or the like. The active part of the submerged valve can then be removed and repaired or replaced in situ, or withdrawn into the upper box for inspection on the surface following closure of the intermediate valve and disconnection of the lower box from the body of the intermediate valve.

2 Claims, 1 Drawing Figure

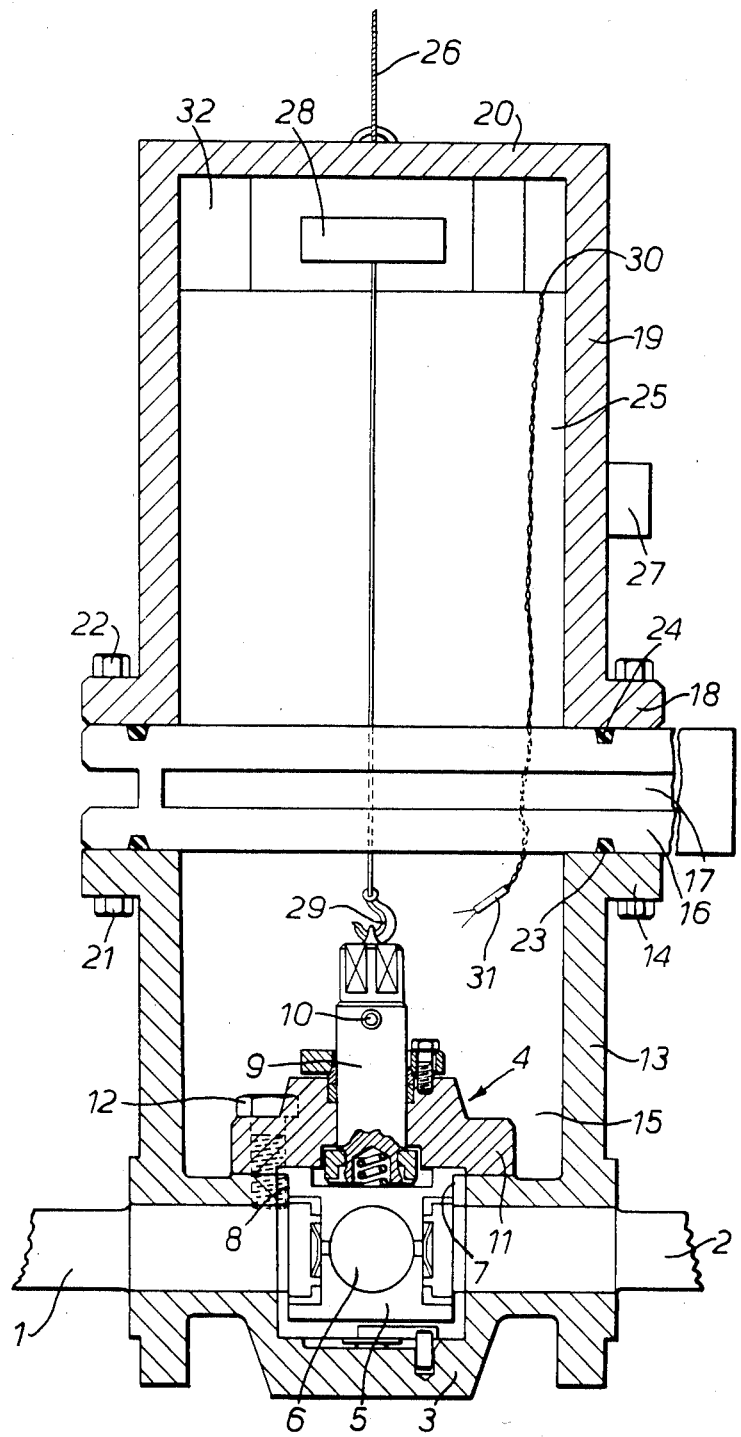

DEVICE FOR WORKING ON A SUBMERGED VALVE

BACKGROUND OF THE INVENTION

The present invention relates to an apparatus for working on a submerged valve, e.g. on an underwater cock, to enable its maintenance or repair.

At the present time, such work requires the removal of the cock or at least the active part thereof under water, and the raising of the cock or active part to the surface. Consequently, an oil line or the like in which the cock is mounted has to be flooded, causing a long shutdown of the installation of which it forms a part. This shutdown is especially costly where an oil production line is concerned.

SUMMARY OF THE INVENTION

According to the invention there is provided an apparatus for serving a submerged valve having a valve body, a closure member movable within the body, and an actuating rod projecting upwardly from the valve body. A lower box for vertical installation has an open upper end and a lower end integral with the valve body and surrounding the actuating rod. An upper box has a closed upper end and an open lower end, and contains a lifting device, a screwing and unscrewing robot, a camera, and pumps. An intermediate valve is slidable in a generally flat body, and may be sealingly connected between the upper and lower boxes.

Two superimposed chambers can thus be produced and, when the intermediate valve is opened, they may be emptied of water to allow the active part of the valve to be lifted into the upper chamber, after which, if the work to be carried out so requires, the intermediate valve may be closed to isolate the lower chamber and make it possible to raise to the surface the upper box together with the active part of the valve. The upper box is later lowered again together with the new or repaired active part of the valve, the upper chamber is emptied of water, and the intermediate valve is re-opened and the new active part of the valve is installed.

The body of the valve may be modified in comparison with a conventional valve body, to allow the leakproof fastening of the lower box. For example, its outer configuration may simply incorporate, on each longitudinal side of the location of the active valve part, a sufficiently long tubular portion to make it possible to grasp it in a leakproof manner between a half-collar formed on a side wall of the lower box and a matching half-collar formed on a shell which can be fastened removably and in a leakproof manner to the lower part of the lower box. In this case, the entire apparatus is installed only at the time of use.

Preferably, the lower box is fired permanently to the valve body, a flange being formed on the upper end thereof for connection to the intermediate valve body. The remainder of the apparatus is then brought into position on the lower box when work is to be carried out.

The same apparatus may be used completely or partially for working on a plurality of valves each having a body adapted to receive the device.

BRIEF DESCRIPTION OF THE DRAWINGS

In the drawing, the single FIGURE shows, in elevation and in partial section, a valve equipped with an embodiment of a servicing apparatus according to the invention.

DETAILED DESCRIPTION OF THE PREFERRED EMBODIMENT

In the drawing, a fluid transfer line is represented by two pipe ends 1 and 2 which are connected to the body 3 of a valve, e.g. a cock 4. The passage of a fluid through the cock 4 depends on the position of a rotary closure member or shutter 5 which defines a through passage 6 on a first diameter and carries closure components 7 on a second diameter for sealing against seats 8. The rotary shutter 5 is angularly displaced by an actuating rod 9, the position of which is indicated by a position indicator 10. The active part of the cock is retained in the body 3 by a cap or bonnet 11 which is fixed in place by bolts 12 and through which the actuating rod 9 passes.

The body 3 is integral with a lower box 13, whose upper portion ends in a flange 14. The box 13 forms a chamber 15 which is open at the top during normal operation of the cock 4 and which contains and surrounds the bonnet 11 and the actuating rod 9. The flange 14 is adapted, in the event of work on the cock 4, to receive a flat body 16 in which an intermediate valve 17 known as a "sandwich valve" is slidably disposed, making it possible to close the upper end of the box 13 and thus isolate the chamber 15. The upper portion of the body 16 of the intermediate valve 17 is adapted to receive a flange 18 provided on the open lower end of an upper box 19, closed at the top by an end member 20. Leakproof connections between the body 16 and the flanges 14 and 18 are provided by bolts 21 and 22 and gaskets 23 and 24.

The box 19 forms a chamber 25 open at its lower end when the box is not fastened to the body 16 or when the valve 17 is open.

The box 19 can be carried and displaced via its end member 20 by means of an electrical and carrying cable 26, through which power and control signals can be transmitted to members associated with the box and information can be transmitted to the surface of the body of water in which the cock 4 is located.

Box 19 carries a system of pumps 27 making it possible to empty the water from the chambers 15 and 25 and introduce nitrogen into them, and contains a lifting appliance 28 with a hook 29 capable of hooking onto the actuating rod 9, a camera 30, 31 and a screwing/unscrewing robot 32. Other devices can be provided in the box 19, in particular repair robots. In general terms, the box 19 is an underwater appliance which can transport all the robots necessary for the operations of repairing the cock 4 on the spot. Furthermore, it is designed to receive the active part, namely the rotary unit or valve unit, of the cock 4, in order to raise the unit to the surface of the water. It is therefore capable of carrying out several operations, in particular the inspection of the cock 4, the removal of the active part of the latter, repairs on the spot, lifting, reinstallation, and the like.

A sequence of operations which can be carried out by means of the described apparatus and which avoids any flooding of the pipe, termed a "cold repair", is as follows:

lowering the body 16 and the intermediate valve 17, and fastening to the flange 14;
lowering the box 19 and fastening to the body 16 of the intermediate valve 17;
testing the equipment;

emptying the water contained in the chambers 15 and 25;

testing;

injecting nitrogen into the chambers 15 and 25;

preparing for the extraction of the active part of the cock 4;

extracting the active part of the cock;

storing the active part in the chamber 25;

inspecting the cock body 3;

closing the intermediate valve 17;

recovering the box 19 on a surface support platform or vessel;

installing a new active part of the cock in the box 19;

lowering and fastening the box 19 to the body 16 of the intermediate valve 17;

testing;

emptying the water contained in the chamber 25 and injecting nitrogen;

opening the intermediate valve 17;

preparing for the installation of the new active part of the cock;

installing the new active part of the cock 4;

flooding the chambers 15 and 25; and recovering the box 19 and the body 16 and intermediate valve 17 on the surface of the water.

What is claimed is:

1. An apparatus for servicing a submerged valve which comprises a valve body (3), a closure member (5) movable within said body, and actuating means (9) for said closure member, said actuating means projecting upwardly from said valve body, said apparatus comprising: a lower box means (13) adapted for vertical installation and having an open upper end and a lower end sealingly fixed to said valve body such that said lower box means surrounds said actuating means; an upper box means (19) adapted to be installed vertically and having a closed upper end (20) and an open lower end, said upper box means containing lifting means (28) for removing and replacing said actuating means, a screwing and unscrewing robot (32) for assembling and disassembling said submerged valve and a camera (30, 31), pumping means (27) provided on said upper box means for moving fluids into and out of said box means; an intermediate valve (17) slidably disposed in a generally flat body (16); and means (21–24) for sealingly connecting said flat body of said intermediate valve between said open upper end of said lower box means and said open lower end of said upper box means.

2. An apparatus according to claim 1, wherein said lower box means is permanently fixed to said submerged valve body, and wherein said open upper end of said lower box means defines a flange (14) for connection to said flat body of said intermediate valve.

* * * * *